Patented June 24, 1952

2,601,255

UNITED STATES PATENT OFFICE 2,601,255

ACRYLONITRILE POLYMER SOLUTIONS IN A CYCLIC CARBONATE SOLVENT CONTAINING A KETONE AS A DISCOLORATION INHIBITOR

Herman A. Bruson, Shaker Heights, Ohio, assignor to Industrial Rayon Corporation, Cleveland, Ohio, a corporation of Delaware No Drawing. Application August 13, 1949, Serial No. 110,227

10 Claims. (Cl. 260—30.4)

The present invention relates to the production of stabilized polymer compositions having a minimum of discoloration. More particularly, it relates to the production of certain acrylonitrile polymer spinning solutions and the process of forming therefrom, shaped articles such as fibers, threads, yarns, films, etc., of improved color-free appearance. The improved spinning solutions of the present invention are made from certain organic solvents and homopolymers and copolymers of acrylonitrile, which polymers contain in the polymer molecule at least 80% by weight of acrylonitrile. Such homopolymers and copolymers are referred to herein as "polymers." The term "spinning solution" is intended to include extrudable polymer-solvent masses in the form of solid or semi-solid gels, viscous liquids, dispersions and true solutions.

In the production of shaped articles from polymers of acrylonitrile, it is usually necessary to dissolve the polymers in a suitable organic solvent by means of heat, and to maintain such solutions at elevated temperatures for prolonged periods of time during the spinning operation such as, for example, extruding such heated solutions into either heated air or hot liquid coagulating baths. During such operations, the color of the spinning solutions undergoes a progressive darkening which affects the color of the articles produced.

According to the present invention, the discoloration of certain cyclic carbonate spinning solutions of acrylonitrile polymers is inhibited by incorporating in such solutions, a colorless ketonic compound having two ketonic carbonyl groups, only one hydrogen-bearing carbon atom between the two said ketonic groups, and the remainder of the ketonic compound consisting of carbon and hydrogen atoms. The cyclic carbonate solvents used in the preparation of the spinning solutions of the present invention are the cyclic carbonates of 1,2-, 2,3-, and 1,3-dihydric aliphatic alcohols having no more than four carbon atoms in their alkylene radical and the acrylonitrile polymers used are the homopolymers and copolymers of acrylonitrile containing in the polymer molecule at least 80% by weight of acrylonitrile.

The ketonic compounds employed in accordance with this invention may be exemplified by the general structure $$R_2-\overset{O}{\underset{}{C}}-\overset{H}{\underset{R_1}{C}}-\overset{O}{\underset{}{C}}-R_2$$

in which $R_1$ and $R_2$ are hydrocarbon groups which may take the form of alkyl, alkylene, aryl or aralkyl radicals, and in addition, $R_1$ may also be hydrogen. These ketonic compounds may take the form of cyclic compounds of the following general structure, that is (a) where both of the $R_2$ groups shown above form a single hydrocarbon group (a) 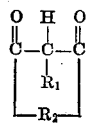

or (b) where $R_1$ forms a single hydrocarbon group (X below) with either of the $R_2$ groups (b) 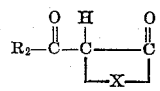

Advantageously, the spinning solutions of this invention may be extruded into a liquid coagulating medium and the freshly coagulated material then washed and processed as described hereinafter, to form shaped articles of improved color-free appearance.

Typical colorless ketonic compounds which can be used for the purpose of this invention are, for example, the following:

$$CH_3-CO-CH_2-CO-CH_3$$
Acetylacetone $$CH_3CH_2-CO-CH_2-CO-CH_3$$
Propionylacetone $$(CH_3)_2CH-CO-CH_2-CO-CH_3$$
Isobutyryl acetone $$C_2H_5-CO-CH_2-CO-C_2H_5$$
Dipropionylmethane $$C_6H_5-CO-CH_2-CO-C_6H_5$$
Dibenzoylmethane $$C_6H_5-CO-CH_2-CO-CH_3$$
Benzoylacetone

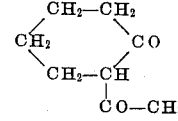
2-acetylcyclohexanone

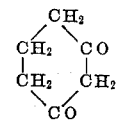
Cyclohexandione-2,4

The proportion of the ketonic compounds which may be incorporated in the acrylonitrile polymer solutions is relatively small; minor proportions in amounts of the order of about 0.1% to 3%, based on the weight of the solution, being sufficient for the purposes of the present invention.

The following examples in which the parts and percentages given are by weight, will further illustrate this invention. It is understood, however, that the invention is not intended to be limited by these examples.

*Example I*

A mixture of 20 parts polyacrylonitrile (Mol. wt. about 58,000), 80 parts ethylene carbonate, and 1 part acetylacetone was heated in air at 100° C. for six hours. A clear solution was obtained which had a very faint yellow color. A mixture of the same quantities of the same ingredients but without the acetylacetone, turned a dark amber color in six hours at 100° C. Thereafter, while maintained at such temperature, each solution was extruded through a 40-hole spinneret (0.003 inch orifice diameters) into a coagulating bath consisting of triethylene glycol at about 120° C. for a distance of 25 inches bath travel. The coagulated bundle of filaments was withdrawn from the bath and collected by a positively-driven spool without imparting substantially any stretch to the filaments. The spooled filaments were washed with soft water at room temperature to remove substantially all of the coagulant. The washed yarn was led from the spool through a steam chamber at about 125° C. to a drum being driven at about 125 meters per minute, the yarn thereby being stretched about 8.55 times its original length. The steam chamber consisted of a metal tube about 30 inches in length, having constricted orifices at both ends for the passage of thread therethrough and to minimize the escape of steam. The yarn thus obtained was air dried and collected. The resulting yarn had a tenacity of about 4.8 grams per denier and an elongation at break of about 9%. If desired, the elongation of the yarn can be further increased by heat treating the yarn in a substantially relaxed condition.

The yarn obtained from the spinning solution containing the acetylacetone, was a substantially color-free product. The yarn produced from the other spinning solution, however, had a yellowish cream color. The tenacity and elongation values of both yarns were about the same.

*Example II*

Mixtures containing 20% by weight of the following acrylonitrile copolymers were prepared in ethylene carbonate:

(a) 95% acrylonitrile—5% vinylacetone (Mol. wt. about 55,000).

(b) 98% acrylonitrile—2% styrene (Mol. wt. about 59,000).

(c) 97% acrylonitrile—3% methyl methacrylate (Mol. wt. about 63,000).

Corresponding mixtures (d), (e) and (f), respectively, were prepared which were similar to the above, except that each contained in addition, 1% benzoylacetone based on the weight of the solutions.

The six mixtures were placed in open test tubes and heated at 100° C. for a period of twelve hours. At the end of this time, solutions (a), (b) and (c) were dark amber in color for a depth of about ¼ inch from the top surface exposed to the air, whereas the corresponding benzoylacetone-containing solutions (d), (e) and (f) remained a pale amber color throughout.

In a similar manner, the other ketonic compounds of this invention can be used in place of benzoylacetone to give both color-stabilized polymer solutions and also substantially color-free thread and yarn products.

Among the cyclic carbonate solvents suitable for use in the practice of the present invention for preparing the polymeric acrylonitrile spinning solutions are, for example, propylene carbonate, trimethylene carbonate, 1,2-butylene carbonate, 1,3-butylene carbonate, 2,3-butylene carbonate and isobutylene carbonate. However, particular advantages are derived by the employment of ethylene carbonate.

Thread and yarn products having especially advantageous properties such as high orientation, high tenacity, high elastic recovery, low shrinkage, low discoloration, high stability, etc., may be prepared from the compositions of this invention by using polyacrylonitrile or acrylonitrile copolymers (containing at least 80% acrylonitrile) of vinyl esters such as vinyl acetate, vinyl formate, vinyl benzoate; vinyl ethers; and vinyl ketones; acrylic acid and its esters and amides; methacrylic acid and its esters, amides, and nitrile; maleic, itaconic, fumaric acids and their esters, amides and nitriles; allyl alcohol and its esters; styrene and nuclear substituted styrenes; and the like.

For various purposes it may be desirable to chemically and physically modify the polymeric compositions of this invention by the presence of other materials such as, for example, pigments, dyes, plasticizers, spinning agents, etc.

The acrylonitrile polymers and copolymers may be prepared by any suitable polymerization method such as, for example, the ammonium persulfate catalyzed polymerization of monomer or monomers dissolved or emulsified in water. Molecular weights of these polymers and copolymers are preferably within the range of 10,000 and 250,000, or even higher, although polymers having molecular weights between 40,000 and 150,000 may be used with particular advantage in the production of shaped articles such as filaments, threads, yarns, etc.

In general, polymer spinning solutions suitable for practicing this invention may be prepared by heating a mixture consisting of finely divided acrylonitrile polymer, a cyclic carbonate solvent and a colorless ketonic compound of the type described herein, to temperatures from about 50° C. to 100° C. For example, the solvent, ethylene carbonate, may be used with advantage to produce a spinning solution having a solids content between about 10% and 30% solids. Advantageously, the heated mixtures of polymer and solvent or solutions thereof are maintained, prior to extrusion, in inert or oxygen-free atmospheres to further minimize discoloration. The temperature of the spinning solutions at extrusion may be maintained with advantage between about 50° C. and 125° C. However, if desired, under suitable conditions, even higher temperatures may be employed such as, for example, up to about 150° C. Such spinning solutions may then be extruded into a liquid coagulating medium maintained at temperatures between about 50° C. and 150° C. or if desired, under suitable conditions, at a higher temperature such as, for example, up to about 170° C. The liquid coagulating medium may, with advantage, consist of polyalkylene ether glycols such as, for example, triethylene glycol, tetraethylene glycol, etc. Such coagulating media may consist of such glycols alone or such glycols may be diluted with suitable amounts of other materials such as, for example, varying quantities of water or other organic compounds. In general, when water is employed in combination with the glycol ethers, a lower bath temperature may be employed with advantage.

The resulting coagulated material may then be withdrawn from the liquid coagulating medium and thereafter washed with an aqueous medium such as water. Washed articles such as threads and yarns may thereafter be stretched up to 600–1000 percent or more. Such stretching may be accomplished in secondary baths containing materials similar to those of the coagulating medium employed, or if desired, other heated media may be employed as, for example, inert liquids, vapors or gases, e. g. steam.

The stretched products may be heat treated while in a relaxed condition at temperatures of between about 100° C. and 180° C. to improve their physical properties.

Oleaginous materials such as finishing oils or waxes, may be applied to the yarn and thread products after the heat treating step, or if desired, before the heat treating step.

The present invention not only provides a color-stabilized spinning solution but in addition, provides a wet-spinning process for making improved polymer products. Thus, for example, the colorless ketonic compounds of the present invention do not affect the efficiency of the cyclic carbonate solvents and particularly, ethylene carbonate. Particular advantages are derived in this connection when employing ethylene carbonate as the polymer solvent since neither the solvent efficiency nor the stability of the carbonate is adversely affected. Moreover, the employment of the ketonic compounds herein not only yields substantially color-free, odorless products, but in addition, such compounds do not adversely affect the other physical properties of the fibers, nor cause corrosion of the metal equipment employed.

I claim:

1. A composition comprising the following: a polymer of acrylonitrile containing in the polymer molecule at least 80% by weight of acrylonitrile; as a solvent therefor a compound selected from the group consisting of the cyclic carbonates of 1,2-, 2,3-, and 1,3-dihydric aliphatic alcohols having no more than four carbon atoms in their alkylene radical; and a relatively small amount of a colorless ketonic compound having two ketonic carbonyl groups, said ketonic compound having only one hydrogen-bearing carbon atom between its ketonic groups, and the remainder of said ketonic compound consisting of carbon and hydrogen atoms.

2. A composition useful for the formation of shaped articles comprising the following: a polymer of acrylonitrile containing in the polymer molecule at least 80% by weight of acrylonitrile; as a solvent therefor ethylene carbonate; and a relatively small amount of a colorless ketonic compound having two ketonic carbonyl groups, said ketonic compound having only one hydrogen-bearing carbon atom between its ketonic groups, and the remainder of said ketonic compound consisting of carbon and hydrogen atoms.

3. A composition as defined in claim 2 in which the diketone component comprises acetylacetone.

4. A composition as defined in claim 2 in which the diketone component comprises benzoylacetone.

5. A composition as defined in claim 2 in which the diketone component comprises 2-acetylcyclohexanone.

6. A composition as defined in claim 2 in which the diketone component comprises propionylacetone.

7. A composition as defined in claim 2 in which the diketone component comprises cyclohexandione-2,4.

8. A spinning solution useful for the formation of filamentary material comprising the following: a polymer of acrylonitrile containing in the polymer molecule at least 80% by weight of acrylonitrile; as a solvent therefor ethylene carbonate; and between about 0.1% and 3.0% of a colorless ketonic compound having two ketonic carbonyl groups, said ketonic compound having only one hydrogen-bearing carbon atom between its ketonic groups, and the remainder of said ketonic compound consisting of carbon and hydrogen atoms; said polymer having a molecular weight between about 10,000 and 250,000 and comprising between about 10% and 30% by weight of the composition.

9. The method of preparing an acrylonitrile polymer spinning solution which comprises the steps of, admixing ethylene carbonate, a polymer of acrylonitrile containing in the polymer molecule at least 80% by weight of acrylonitrile, and a relatively small amount of a colorless ketonic compound having two ketonic carbonyl groups, said ketonic compound having only one hydrogen-bearing carbon atom between its ketonic groups, and the remainder of said ketonic compound consisting of carbon and hydrogen atoms; and heating said resulting mixture to an elevated temperature.

10. The method of preparing an acrylonitrile polymer spinning solution as defined in claim 9 in which the ketonic compound employed comprises acetylacetone.

HERMAN A. BRUSON.

REFERENCES CITED

The following references are of record in the file of this patent:

UNITED STATES PATENTS

| Number | Name | Date |
| --- | --- | --- |
| 2,426,719 | Watkins | Sept. 2, 1947 |
| 2,502,030 | Scheiderbauer | Mar. 28, 1950 |

FOREIGN PATENTS

| Number | Country | Date |
| --- | --- | --- |
| 896,083 | France | Apr. 17, 1944 |